J. C. MORRISON.
LUGGAGE RACK FOR AUTOMOBILES.
APPLICATION FILED NOV. 28, 1916.
1,217,807.
Patented Feb. 27, 1917.
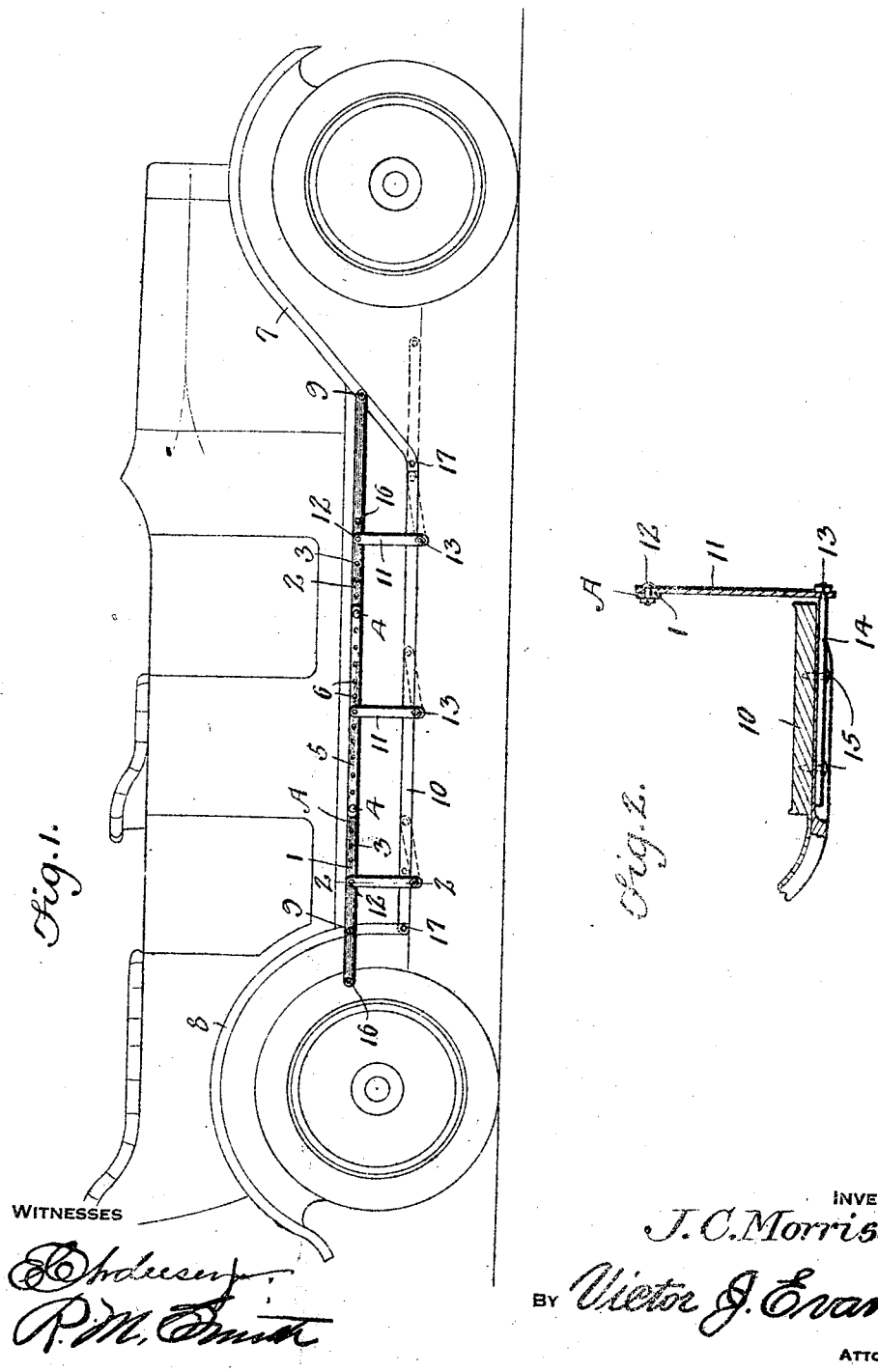
WITNESSES
INVENTOR
J. C. Morrison,
BY Victor J. Evans
ATTORNEY

UNITED STATES PATENT OFFICE.

JOHN C. MORRISON, OF SPOKANE, WASHINGTON.

LUGGAGE-RACK FOR AUTOMOBILES.

1,217,807.   Specification of Letters Patent.   Patented Feb. 27, 1917.

Application filed November 28, 1916. Serial No. 133,913.

*To all whom it may concern:*

Be it known that I, JOHN C. MORRISON, a citizen of the United States, residing at Spokane, in the county of Spokane and State of Washington, have invented new and useful Improvements in Luggage-Racks for Automobiles, of which the following is a specification.

This invention relates to luggage racks for automobiles the object in view being to provide a rack applicable to the present day automobile and so connected with and related to one of the running boards and the front and rear mud guards to which the running board is attached, that said rack may be swung to and from its position of use and when not in use, will occupy a position substantially flush with the outer edge of the running board so that it will not interfere with the complete and satisfactory use of the running board and its presence on the machine will not be noticeable to the casual observer.

The device is especially designed for the use of tourists, campers and hunters, being designed to securely hold suit-cases, bedding and various articles of luggage and thereby being especially adapted for travel in the West and Middle West, particularly.

Another object of the invention is to provide a rack of the general character above referred to which may be adjusted to suit different machines and wheel bases of different lengths without requiring material alteration in the rack itself.

With the above and other objects in view, the invention consists in the novel construction, combination and arrangement of parts, herein described, illustrated and claimed.

In the accompanying drawing:—

Figure 1 is a side elevation of a sufficient portion of an automobile to illustrate the improved rack in its applied relation thereto.

Fig. 2 is a vertical cross section on the line 2—2 of Fig. 1.

The rack contemplated in this invention comprises a normally horizontal bar or member designated generally at A, the same, in the preferred embodiment of the invention, being formed in two sections 1 and 2 arranged in longitudinal alinement with each other and formed adjacent to their meeting ends with a longitudinal series of holes 3 to receive fasteners 4 in the form of bolts, rivets or the equivalent thereof which also pass through a splice bar 5 likewise formed with holes 6 to receive the fasteners 4. The splice bar 5 thus provides for lengthening and shortening the main horizontal rack bar A to suit different lengths of wheel base.

When the main rack bar A is in its position of use, it is connected adjacent to its opposite extremities to the flanges 7 and 8 of the front and rear mud guards respectively as shown in Fig. 1, by fasteners 9 inserted through the end portions of the bar A and through holes formed in the flanges 7 and 8 of the mud guards. The bar A is supported at a considerable elevation above the running board 10 of the vehicle by swinging links 11. Any desired number of these links may be employed, the same being connected by pivots 12 to the bar A and being pivotally mounted at their lower ends on studs 13 projecting from straps 14 extending transversely under the running board 10 and connected by fastening means 15 in fixed relation thereto.

The useful position of the rack is illustrated in Fig. 1 in full lines and the folded position thereof is indicated by dotted lines in the same figure, the bar A being provided with additional holes 16 to receive the fasteners 9 when the bar A is swung downwardly into the horizontal plane of the running board 10, the fasteners 9 being then inserted through other holes 17 in the flanges 7 and 8 of the front and rear mud guards. Thus the main bar A of the supporting rack is fastened either in its useful position or in its folded position along the side of the outer edge of the running board 10. When in its folded position the rack is hardly noticeable and will not interfere with persons entering and leaving the vehicle.

If desired, the luggage rack may be entirely detached from the vehicle when not required in use and when applied to the vehicle, it may be readily adjusted to different lengths of running boards and different styles and sizes of fenders or mud guards.

I claim:—

1. The combination with the running board and the front and rear mud guards of an automobile, of a luggage rack comprising a main substantially horizontal bar, pivotal links for supporting said bar at an elevation above the running board, said links having a pivotal connection with said bar and a pivotal relation to the running board and being parallel to each other, and fastening means for securing said rack bar adjacent to its opposite ends to the front and rear mud guards either in an elevated position or in a position along-side the outer edge of the running board.

2. The combination with the running board and the front and rear mud guards of an automobile, of a luggage rack comprising a main substantially horizontal bar, pivotal links for supporting said bar at an elevation above the running board, said links having a pivotal connection with said bar and a pivotal relation to the running board and being parallel to each other, and fastening means for securing said rack bar adjacent to its opposite ends to the front and rear mud guards either in an elevated position or in a position along-side the outer edge of the running board, said main rack bar being longitudinally extensible.

In testimony whereof I affix my signature.

JOHN C. MORRISON.